US012031826B2

(12) United States Patent
Singh et al.

(10) Patent No.: US 12,031,826 B2
(45) Date of Patent: Jul. 9, 2024

(54) METHODS AND SYSTEMS FOR PATH-BASED MAPPING AND ROUTING

(71) Applicant: 3M INNOVATIVE PROPERTIES COMPANY, St. Paul, MN (US)

(72) Inventors: Gautam Singh, Woodbury, MN (US); John M. Kruse, Minneapolis, MN (US); Ronald D. Jesme, Plymouth, MN (US); William J. Kelliher, Jr., Lino Lakes, MN (US); Jacob E. Odom, Savage, MN (US); Adam C. Nyland, St. Paul, MN (US); Nicholas T. Gabriel, Grand Rapids, MN (US); Jason L. Aveldson, Prior Lake, MN (US); Haleh Hagh-Shenas, Plymouth, MN (US); Frank T. Herfort, Korschenbroich (DE); Michael L. Gjere, South St. Paul, MN (US); Rachneet Kaur, Champaign, IL (US); Elias Wilken-Resman, Minneapolis, MN (US); Jae Yong Lee, Santa Clara, MN (US); Doug A. Addleman, Minneapolis, MN (US); Glenn E. Casner, Woodbury, MN (US); James D. Carlson, Minneapolis, MN (US); Justin Tungjunyatham, Roseville, MN (US); Karl Battle, Woodbury, MN (US); Steven G. Lucht, Woodbury, MN (US)

(73) Assignee: 3M Innovative Properties Company, St. Paul, MN (US)

(*) Notice: Subject to any disclaimer, the term of this patent is extended or adjusted under 35 U.S.C. 154(b) by 464 days.

(21) Appl. No.: 17/596,012

(22) PCT Filed: May 28, 2020

(86) PCT No.: PCT/IB2020/055092
§ 371 (c)(1),
(2) Date: Dec. 1, 2021

(87) PCT Pub. No.: WO2020/245710
PCT Pub. Date: Dec. 10, 2020

(65) Prior Publication Data
US 2022/0228868 A1 Jul. 21, 2022

Related U.S. Application Data

(60) Provisional application No. 62/857,045, filed on Jun. 4, 2019.

(51) Int. Cl.
*G01C 21/16* (2006.01)
*G01C 21/20* (2006.01)
(Continued)

(52) U.S. Cl.
CPC ....... *G01C 21/1652* (2020.08); *G01C 21/206* (2013.01); *G01S 13/426* (2013.01); *G01S 13/867* (2013.01); *G01S 13/89* (2013.01)

(58) Field of Classification Search
CPC . G01C 21/1652; G01C 21/206; G01S 13/426; G01S 13/867; G01S 13/89
(Continued)

(56) References Cited

U.S. PATENT DOCUMENTS 6,122,960 A * 9/2000 Hutchings ............ G01C 22/006
73/865.4
6,813,582 B2 * 11/2004 Levi ..................... G01C 22/006
702/141
(Continued)

FOREIGN PATENT DOCUMENTS

CN 106324616 B 2/2019
CN 107991680 B 8/2019
(Continued)

OTHER PUBLICATIONS

Robert et al., "Wearable Sensor System for Monitoring Body Kinematics," 2015, Publisher: IEEE.*
(Continued)

*Primary Examiner* — Tuan C To
(74) *Attorney, Agent, or Firm* — David B. Patchett

(57) ABSTRACT

Systems and methods of path-based mapping and routing are provided. Translation information and absolute information of mobile objects in environments are determined based on
(Continued)

a fusion of sensing data from a radar and an inertial measurement unit (IMU) including a gyroscope and an accelerometer, from which path-based maps and optimal routes can be generated.

20 Claims, 9 Drawing Sheets

(51) Int. Cl.
    *G01S 13/42*     (2006.01)
    *G01S 13/86*     (2006.01)
    *G01S 13/89*     (2006.01)

(58) Field of Classification Search
    USPC .......................................................... 701/472
    See application file for complete search history.

(56) References Cited

U.S. PATENT DOCUMENTS

| | | | | |
|---|---|---|---|---|
| 6,983,219 | B2 * | 1/2006 | Mantyjarvi | A61B 5/1118 |
| | | | | 702/153 |
| 8,296,063 | B1 | 10/2012 | Baillot | |
| 2003/0182077 | A1 | 9/2003 | Emord | |
| 2008/0077326 | A1 | 3/2008 | Funk et al. | |
| 2019/0154449 | A1 | 5/2019 | Roumeliotis et al. | |
| 2022/0219751 | A1 * | 7/2022 | Aradhyula | G05D 1/0212 |
| 2022/0228868 | A1 * | 7/2022 | Singh | G01C 21/1652 |
| 2023/0050825 | A1 * | 2/2023 | Plikynas | G01C 21/3856 |
| 2023/0100851 | A1 * | 3/2023 | Zilberman | G01C 21/206 |
| | | | | 701/423 |
| 2024/0019224 | A1 * | 1/2024 | O'Dell | F41A 17/063 |
| 2024/0061119 | A1 * | 2/2024 | Gum | G01S 5/145 |

FOREIGN PATENT DOCUMENTS

| | | | | |
|---|---|---|---|---|
| EP | 3064899 | A1 | 9/2016 | |
| EP | 4057227 | A1 * | 9/2022 | ............. G06T 7/246 |
| EP | 4339881 | A1 * | 3/2024 | ............. G06T 17/00 |
| WO | 2018134686 | A2 | 7/2018 | |

OTHER PUBLICATIONS

Rongkai et al., "The Design of Wearable Wireless Inertial Measurement Unit for Body motion Capture System," 2018, Publisher: IEEE.*

M. Schwaab et al., "Measurement Analysis of Multiple MEMS Sensor Array," 2017, Publisher: IEEE.*

Eyezeon Technologies, "Geo-Location (Indoor) Tracking for Emergency Services Personnel", Retrieved from Internet on Sep. 24, 2028, URL: <http://eyezeon.com/geo/>, 6 pages.

International Search Report for PCT Application No. PCT/IB2020/055092, mailed on Sep. 16, 2020, 5 pages.

McCroskey, "Glanser—An Emergency Responder Locator System for Indoor and GPS-Denied Applications", 2010, Proceedings of the 23rd International Technical Meeting of the Satellite Division of the Institute of Navigation, pp. 2901-2909.

Tang, "Wearable Indoor Position Tracking using Onboard K-band Doppler Radar and Digital Gyroscope", 2015, IEEE MTT-S 2015 International Microwave Workshop Series on RF and Wireless Technologies for Biomedical and Healthcare Applications (IMWS-BIO), pp. 76-77.

Vidas, "Hand-Held Monocular SLAM in Thermal-Infrared", 2012 12th International Conference on Control, Automation, Robotics & Vision, pp. 859-864.

* cited by examiner

METHODS AND SYSTEMS FOR PATH-BASED MAPPING AND ROUTING

CROSS REFERENCE TO RELATED APPLICATIONS

This application is a national stage filing under 35 U.S.C. 371 of PCT/IB2020/055092, filed May 28, 2020, which claims the benefit of U.S. Application No. 62/857,045, filed Jun. 4, 2019, the disclosure of which is incorporated by reference in its/their entirety herein.

BACKGROUND

In many hazardous situations, it is valuable to have the ability to track the position of mobile objects (e.g., people, vehicles, etc.). In outdoor environments, satellite-based radio-navigation systems such as Global Positioning Systems (GPS) are widely used to provide geolocation and time information. However, in many hazardous situations such as indoor environments, GPS signals may not be available. Furthermore, many of these hazardous environments may not have access to electricity or WiFi. Examples of these types of hazardous environments might be a burning building, a mine, etc.

SUMMARY

There is a desire to provide mapping and routing systems and methods to effectively track mobile objects, in particular, in environments lacking visibility, GPS signals, wireless networks, radio beacons, and/or other infrastructure that can be used to localize the mobile objects. The present disclosure provides systems and methods to build path-based maps of environments, track mobile objects on the maps, and provide routes from one location on the map to another location on the maps.

In one aspect, the present disclosure describes a method of mapping and routing. The method includes providing a sensor assembly mounted on the wearable pack to be worn by a mobile object, the sensor assembly comprising an inertial measurement unit (IMU) and a radio-frequency (RF) radar unit; collecting, via the sensor assembly, sensing data comprising (i) one or more radar velocities from the RF radar unit, (ii) one or more angular velocities of the mobile object from the IMU, and (iii) one or more linear accelerations from the IMU; determining, via a processor, translation information and absolute orientation information of the mobile object based on the sensing data; determining, via the processor, a time series of poses of the mobile object based on a combination of the determined translation information and the determined absolute orientation information; and combining, via the processor, the time series of poses into a path of the mobile object.

In another aspect, the present disclosure describes a mapping and routing system. The system includes a wearable pack; a sensor assembly mounted on the wearable pack to be worn by a mobile object, the sensor assembly comprising an inertial measurement unit (IMU) and a radio-frequency (RF) radar unit, the sensor assembly configured to sense data comprising (i) one or more radar velocities from the RF radar unit, (ii) one or more angular velocities of the mobile object from the IMU, and (iii) one or more linear accelerations from the IMU; and a processor configured to: determine translation information and absolute orientation information of the mobile object based on the sensing data from the sensor assembly; determine a time series of poses of the mobile object based on a combination of the determined translation information and absolute orientation information; and combine the time series of poses into a path of the mobile object.

Various unexpected results and advantages are obtained in exemplary embodiments of the disclosure. Advantages of exemplary embodiments of the present disclosure include, for example, path-based maps generated by a fusion of sensor data from an inertial measurement unit (IMU), a radar, and/or imaging cameras, which can be used to generate a suggested route within the environment. The methods and systems described herein can be specifically advantageous for hazardous environments where GPS or other localization systems are not available and/or where cameras sensitive to the visible light spectrum or heat source may not provide good imaging signals.

Various aspects and advantages of exemplary embodiments of the disclosure have been summarized. The above Summary is not intended to describe each illustrated embodiment or every implementation of the present certain exemplary embodiments of the present disclosure. The Drawings and the Detailed Description that follow more particularly exemplify certain preferred embodiments using the principles disclosed herein.

BRIEF DESCRIPTION OF THE DRAWINGS

The disclosure may be more completely understood in consideration of the following detailed description of various embodiments of the disclosure in connection with the accompanying figures, in which.

Figure 1:
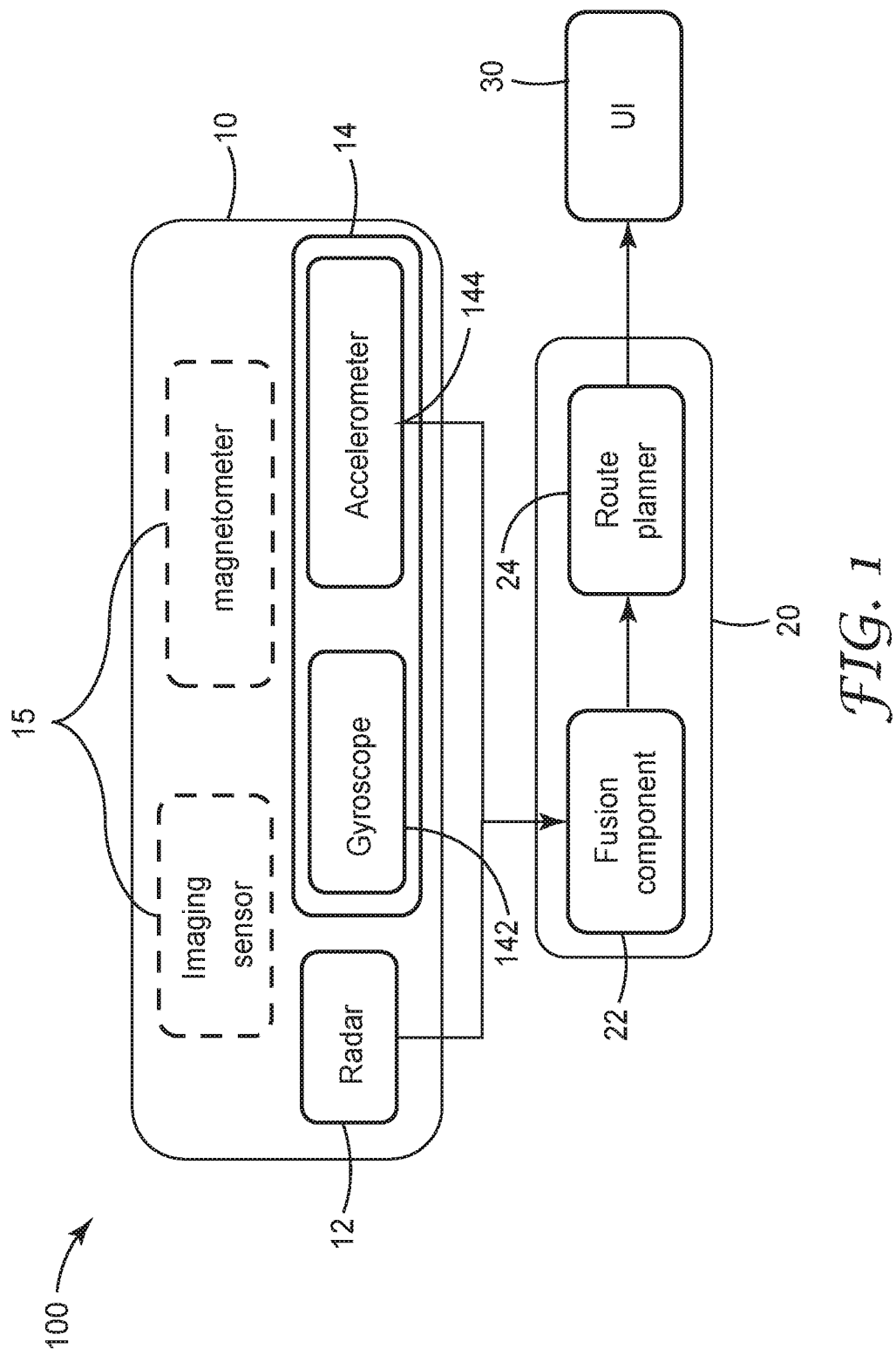
FIG. 1 is a block diagram of an exemplary mapping and routing system, according to one embodiment.

In the drawings, like reference numerals indicate like elements. While the above-identified drawings, which may not be drawn to scale, set forth various embodiments of the present disclosure, other embodiments are also contemplated, as noted in the Detailed Description. In all cases, this disclosure describes the presently disclosed disclosure by way of representation of exemplary embodiments and not by express limitations. It should be understood that numerous other modifications and embodiments can be devised by those skilled in the art, which fall within the scope and spirit of this disclosure.

DETAILED DESCRIPTION

The present disclosure provides systems and methods to build path-based maps of environments, track mobile objects on the maps, and provide routes from one location on the map to another location on the maps. The mapping and routing systems and methods described herein can effectively track mobile objects, in particular, in environments lacking visibility, GPS signals, wireless networks, radio beacons, and/or other infrastructure that can be used to localize the mobile objects.

FIG. 1 is a block diagram of an exemplary mapping and routing system 100, according to one embodiment. The system 100 includes a sensor assembly 10 which can be mounted on a wearable pack (not shown in FIG. 1) to be worn by a mobile object (e.g., people, vehicles, etc.). The sensor assembly 100 includes a radio-frequency (RF) radar unit 12 and an inertial measurement unit (IMU) 14, configured to collect sensing data including (i) one or more radar velocities from the RF radar unit 12, (ii) one or more angular velocities of the mobile object from the IMU 14, and (iii) one or more linear accelerations of the mobile object from the IMU 14.

In the embodiment depicted in FIG. 1, the inertial measurement unit (IMU) 14 includes a gyroscope 142 and an accelerometer 144. The gyroscope 142 can sense rotation data of the mobile object by measuring the angular velocities (e.g., radians per second) around three axes such as x, y, and z axes. The accelerometer 144 can measure linear accelerations (e.g., meter per second squared) of the mobile object along the x, y, and z axes. In some embodiments, the accelerometer 144 can measure an acceleration due to Earth's gravity and provide a gravity reference to the rotation data measured by the gyroscope 142. For example, when the measured acceleration is due to the gravity, the gravitational vector can be decomposed into the 3 accelerometer axes to provide the gravity reference.

In some embodiments, the RF radar unit 12 can sense translation data of the mobile object by measuring one or more velocities of one or more identified objects. The RF radar unit 12 can operate at a typical frequency of, for example, about 76 to 81 GHz, which is much higher as compared to about 50 kHz for a typical ultrasonic sensor that operates at the speed of sound. The RF radar unit 12 can include, for example, one or more Doppler radars or any other suitable RF radars. Based on the Doppler effect, a Doppler radar can measure the speed at which the mobile object is moving. The Doppler effect is a shift in frequency that occurs based on relative velocity between two objects. The derived speed can be integrated to get the relative position of the mobile object from one time to another. It is to be understood that suitable RF radars other than a Doppler radar can be used. For example, one or more distance measurement radars may be used to measure the distance to an object where velocity information can be derived.

In some embodiments, an RF radar can be mounted on a wearable pack worn by a mobile object, where the RF radar points partially at the floor at an angle (i.e., gamma). When the RF radar moves along with the mobile object around the floor, the RF radar can emit RF signals toward the floor or other surrounding objects and receive the reflected signals. The reflected signals can be modulated by the motion of the mobile object. The induced Doppler shift can be used to calculate the translational or Doppler velocity of the mobile object.

Figure 2A:
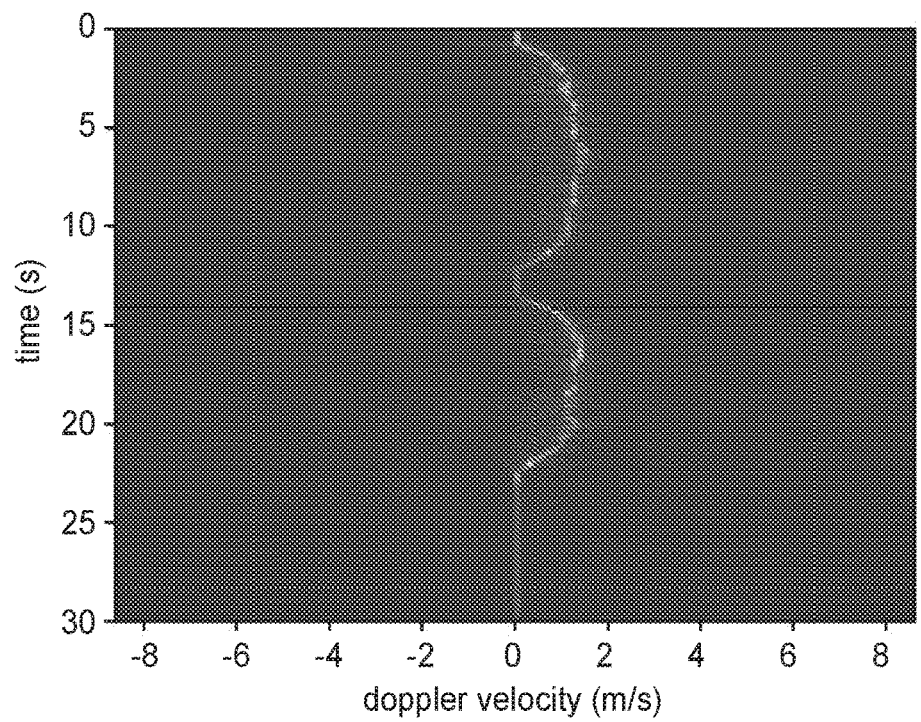
FIG. 2A is a time series of the intensity of Doppler signal, according to one embodiment.

FIG. 2A illustrates a time series of Doppler signal intensity (i.e., Doppler velocity) when the mobile object wears the RF radar and moves on a floor for about 25 seconds, stopping once in the middle. In some embodiments, filtering methods such as, for example, a Kalman filter can be used to remove background noises from the detected Doppler signals.

In some embodiments, the RF radar unit 12 can collect translation data of the mobile object by scanning a time series of radar images of one or more identified objects. Each radar scan can return several reflected points, each with a unique range and azimuth angle, and an intensity, corresponding to the scanned objects. A filter can be applied to return high intensity reflections which can be clustered and tracked relative to the previous radar frame (e.g., a radar image in time). Using an iterative closest point algorithm, the successive images in time can be matched and the translation between detected objects or features with respect to time can provide translation data, e.g., the moving velocity of the mobile object.

Figure 2B:
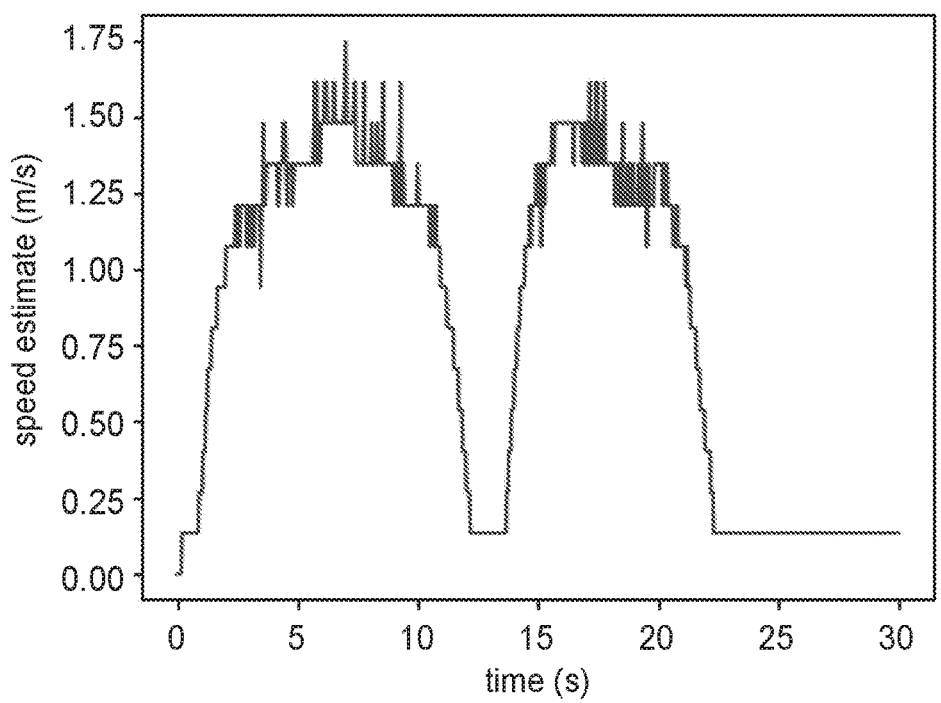
FIG. 2B is a time series of estimated moving velocity from a scanned "floor voxel", according to one embodiment.

FIG. 2B illustrates a time series of estimated moving velocity from a scanned "floor voxel" in the succession of radar images. The "floor voxel" can be one volume element of the scanned scene/image that spans multiple distances and azimuth angles. The radar dataset from the radar images can also include similar data from each of its many other voxels at each combination of range (distance) and azimuth angle. Similar analysis to determine moving velocity can be done from other observed objects in the scene/image besides the floor, and multiple such estimates can be combined to form a single estimation of translation information and rotation information.

In some embodiments, the additional translation and rotation information based on the succession of radar images can be combined with the estimate of translation from radar velocity to get more accurate estimates of translation of the mobile object, and combined with the rotation information from the IMU to get more accurate estimates of orientation of the mobile object.

In some embodiments, the RF radar carried by a mobile object can sense surrounding objects moving at different velocities (e.g., a floor voxel, a wall voxel, or other surrounding objects). By tracking objects across multiple radar images, the transformation (i.e., both translation and rotation) of those tracked objects can be determined. The tracked objects in the environment can be static objects and the relative motion of the tracked objects reflects the motion of the mobile object. The fusion of this additional transformation information with the original transformation information can be carried out with algorithms like Kalman filter.

In some embodiments, application of a Kalman filter may help fuse in multiple measurements for improved prediction. For example, in addition to the original transformation (e.g., from an RF radar or an IMU), environmental objects such as walls and their transformation can be tracked as an additional source of information. When at an individual timestamp, there is an error in the calculation of the original transformation, the tracking of environmental objects like walls can provide another piece of information.

When the mobile object moves from a first position P1 $(x_1, y_1, z_1)$ to a second adjacent position P2 $(x_2, y_2, z_2)$, a time series of radar velocities can be measured by the RF radar unit. Each measured radar velocity of the mobile object can be decomposed to the x, y and z axes as $v_x$, $v_y$, and $v_z$ based on orientation information of the mobile object. The real-time orientation information can be determined by the inertial measurement unit (IMU) 14 discussed further below. It is to be understood that any identified objects in the environment other than a floor can also be used to measure the radar velocity of the mobile object.

In some embodiments, the sensor assembly 10 may include one or more optional sensors 15 to provide supplemental sensing data. The optional sensors include, for example, one or more imaging sensors (e.g., a thermal imaging sensor, a visible light imaging sensor, etc.), one or more magnetometers, etc. In some embodiments, one or more thermal imaging sensors, one or more visible light imaging sensors, or a combination thereof can be used to capture imaging data of the surrounding objects in the environment. In some embodiments, one or more magnetometers can be used to derive information from the Earth' magnetic field. The derived information from the magnetometers can help to stabilize the absolute orientation information provided by an IMU.

The sensing data collected by the sensor assembly 10 can be processed by a processor 20. In the depicted embodiment of FIG. 1, the processor 20 can implement a fusion component 22 to determine translation information and absolute orientation information of the mobile object based on the sensing data from the sensor assembly, and determine a time series of poses of the mobile object based on a combination of the determined translation information and the determined the absolute orientation information. Translation information described herein refers to the location of a mobile object in 3D coordinate space, i.e. the (x, y, z) coordinates. Absolute orientation describes how the mobile object is placed with respect to the 3D axes.

The processor 20 can further implement a route planner component 24 to combine the time series of poses into a path of the mobile object. In some embodiments, the route planner component 24 can project the path onto a 2-dimensional (2D) plane associated with a plane of the surrounding environment to generate a 2D map thereof. In some embodiments, the 2D map can be associated with each of multiple stories or floors in a building. In some embodiments, the route planner component 24 can associate the path with a 3-dimensional (3D) space of the surrounding environment to generate a 3D map thereof. In some embodiments, the route planner component 24 can determine an optimal or near-optimal route derived from the path. The processor 20 can output the processed information to display at a user interface (UI) 30.

Figure 3A:
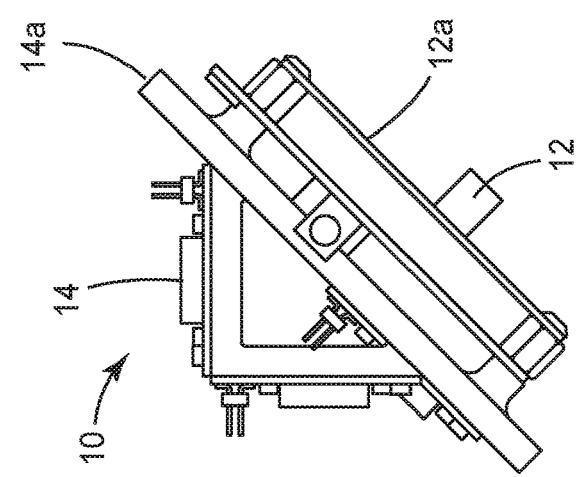
FIG. 3A is a side perspective view of a sensor assembly, according to one embodiment.

FIG. 3A is a side view of the exemplary sensor assembly 10, according to one embodiment. The sensor assembly 10 includes the RF radar unit 12 mounted on a first plate 12a and the IMU 14 mounted on a second plate 14a. The RF radar unit 12 and the IMU 14 are mechanically coupled with a known spatial relationship. In the depicted embodiment of FIG. 3A, the RF radar unit 12 and the IMU 14 are respectively fixed to the plates 12a and 14a, which are positioned such that the orientations of the RF unit 12 and the IMU 14 can always be tracked relative to each other. The RF radar unit 12 is positioned to point toward the floor with a tilted angle (e.g., about 45°).

Figure 3B:
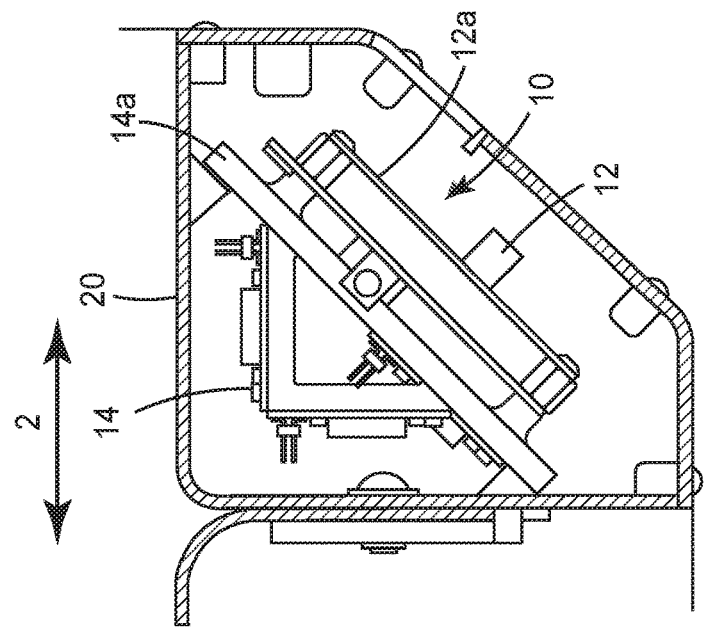
FIG. 3B is a schematic side view of the sensor assembly of FIG. 3A attached to a mounting mechanism, according to one embodiment.

FIG. 3B is a schematic side view of the exemplary sensor assembly 10 attached to a mounting mechanism 21, according to one embodiment. The RF radar unit is tilted at certain degrees (e.g., about 45 degrees) from the elevation plane 2 to provide a non-zero doppler shift from the floor when the mobile object (e.g., a firefighter) walks upright, or during sidestepping on the floor. It is to be understood that the mounting mechanism 21 may have any suitable mechanical configurations to mount the sensor assembly to a mobile object, without obstructing the sensing functions of the sensor assembly 10.

Figure 3C:
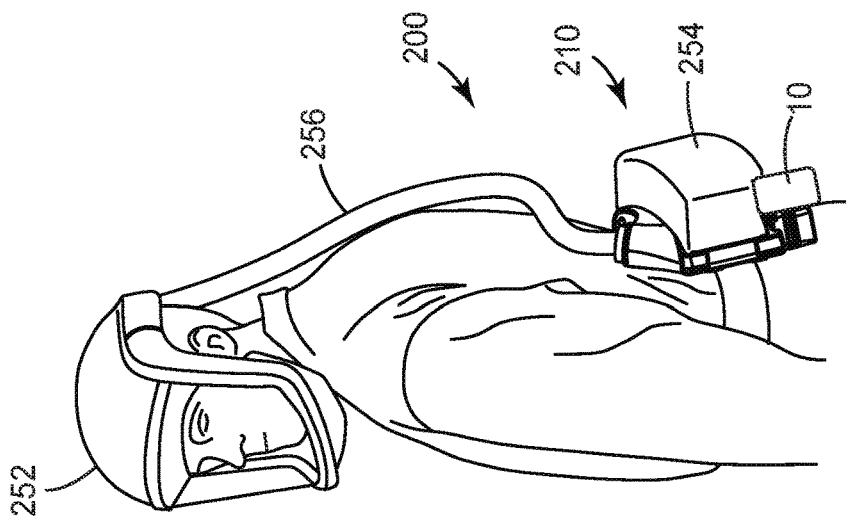
FIG. 3C a diagrammatical illustration of a wearable pack with the sensor assembly of FIG. 3B mounted thereon, according to one embodiment.

FIG. 3C is a diagrammatical illustration of a user wearing a wearable pack 200 with the exemplary sensor assembly 10 mounted thereon, according to one embodiment. The sensor assembly 10 is attached to the wearable pack 200 via the mounting mechanism 21. In the depicted embodiment of FIG. 3C, the wearable pack 200 further includes personal protective equipment (PPE) 210. Typical PPE can include, for example, a self-contained breathing apparatus, an air-purifying apparatus, a backpack, etc. The PPE 210 may further include an optional headpiece 252 which may have an in-mask display to present a user interface to the wearer. It is to be understood that the wearable pack 200 may include other types of PPE or other functional components. In some embodiments, the wearable pack 200 may be a wearable mounting device configured to mount the sensor assembly 10 to a mobile object (e.g., a firefighter). The sensor assembly 10 may be preferably mounted on the body of the wearer, not head-mounted, in order to extract translational motion and decouple rotation of the object from head turns.

Figure 4:
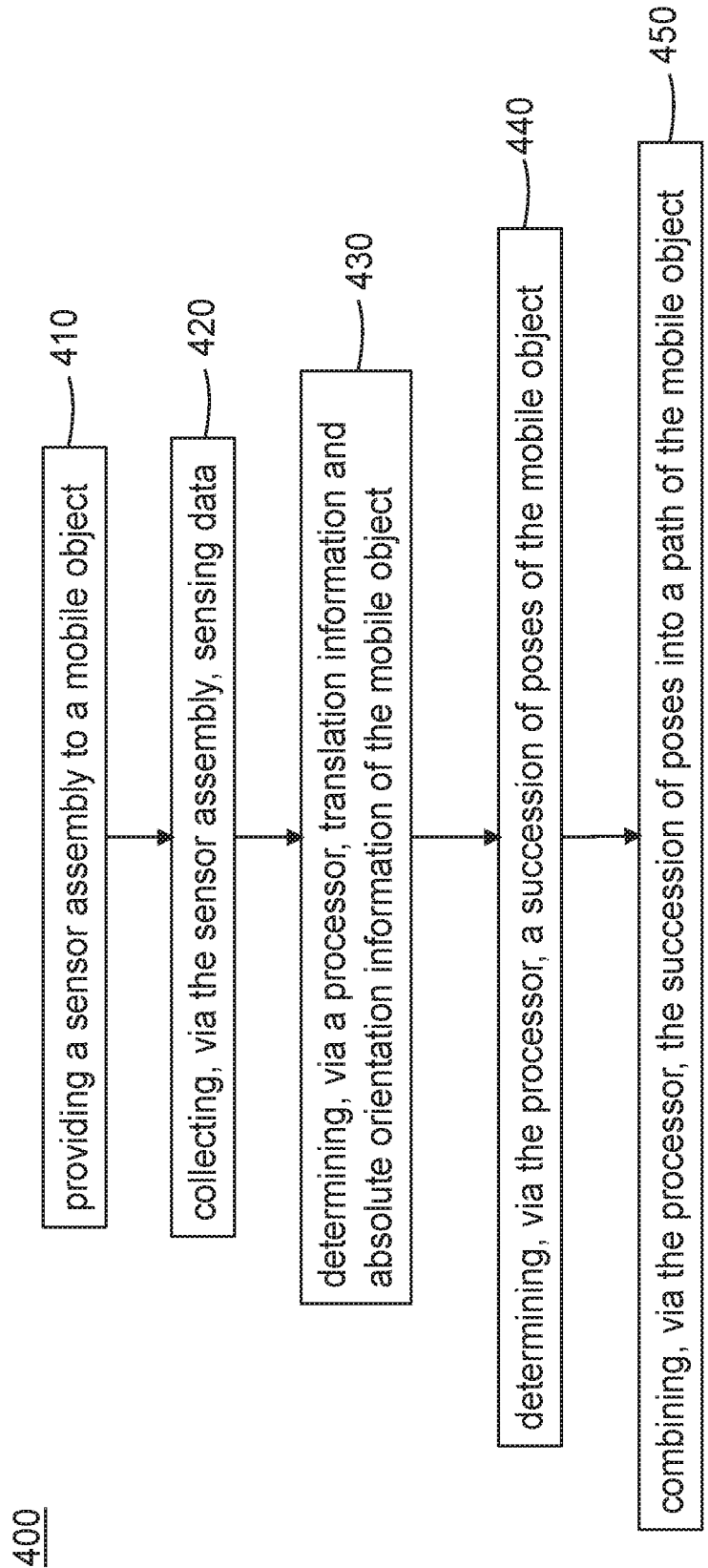
FIG. 4 is a flow diagram of a method of mapping and routing, according to one embodiment.

FIG. 4 is a flow diagram of a method 400 of using a mapping and routing system described herein. At 410, a sensor assembly is provided to a mobile object. One exemplary sensor assembly is the sensor assembly 10 of FIG. 1, which includes an inertial measurement unit (IMU), a RF radar unit and other optional sensors. In some embodiments, the sensor assembly can be mounted on a wearable pack to be worn by the mobile object. One exemplary wearable pack 200 is illustrated in FIG. 3C. The method 400 then proceeds to 420.

At 420, the sensor assembly collects sensing data including, for example, one or more radar velocities from the RF radar unit, one or more angular velocities of the mobile object from the IMU, one or more linear accelerations from the IMU, etc. In some embodiments, a time series of radar velocities can be determined based on the Doppler shift of the RF radar signals. In some embodiments, the RF radar can scan one or more surrounding objects to obtain a time series of radar images. In some embodiments, one or more 6-axis IMUs can be provided, where each IMU can sense accelerations along 3 accelerometer axes and angular velocities about 3 gyroscope axes. The method 400 then proceeds to 430.

At 430, a processor determines translation information and absolute orientation information of the mobile object based on the sensing data from the sensor assembly. In some embodiments, a time series of radar velocity of the mobile object can be determined based on the sensing data from the RF radar. In some embodiments, real-time rotation information can be determined by integration of the sensed angular velocities about the respective 3 gyroscope axes. Real-time absolute orientation information can be determined by combining the real-time rotation information with the acceleration information along the 3 accelerometer axes. A global coordinate system (x, y, z) can be built based on the determined absolute orientation information. Each of the measured radar velocities can be decomposed along the respective x, y and z axes of the global coordinate system. Integration of the decomposed radar velocities can obtain translation information in the global coordinate system along the axes x, y, and z. The method 400 then proceeds to 440.

At 440, the processor determines a time series of poses of the mobile object based on a combination of the determined translation information and absolute orientation information. For example, when the mobile object moves from a first position P1 ($x_1$, $y_1$, $z_1$) to a second adjacent position P2 ($x_2$, $y_2$, $z_2$), a time series of radar velocities can be measured. Each measured radar velocity of the mobile object can be decomposed to the x, y and z axes as $v_x$, $v_y$ and $v_z$ based on the corresponding absolute orientation information of the mobile object. Integration of the velocities $v_x$, $v_y$ and $v_z$ over time can obtain the position information, e.g., a time series of coordinates (x, y, z) of the mobile object. A pairing of position information and absolute orientation information forms pose information of the mobile object. The method 400 then proceeds to 450.

At 450, the processor combines the succession of poses into a path of the mobile object. For example, when the mobile object moves from a first position P1 ($x_1$, $y_1$, $z_1$) to a second adjacent position P2 ($x_2$, $y_2$, $z_2$) in the environment, a time series of pose information can build a path from the first position P1 ($x_1$, $y_1$, $z_1$) to the second adjacent position P2 ($x_2$, $y_2$, $z_2$).

Figure 7:
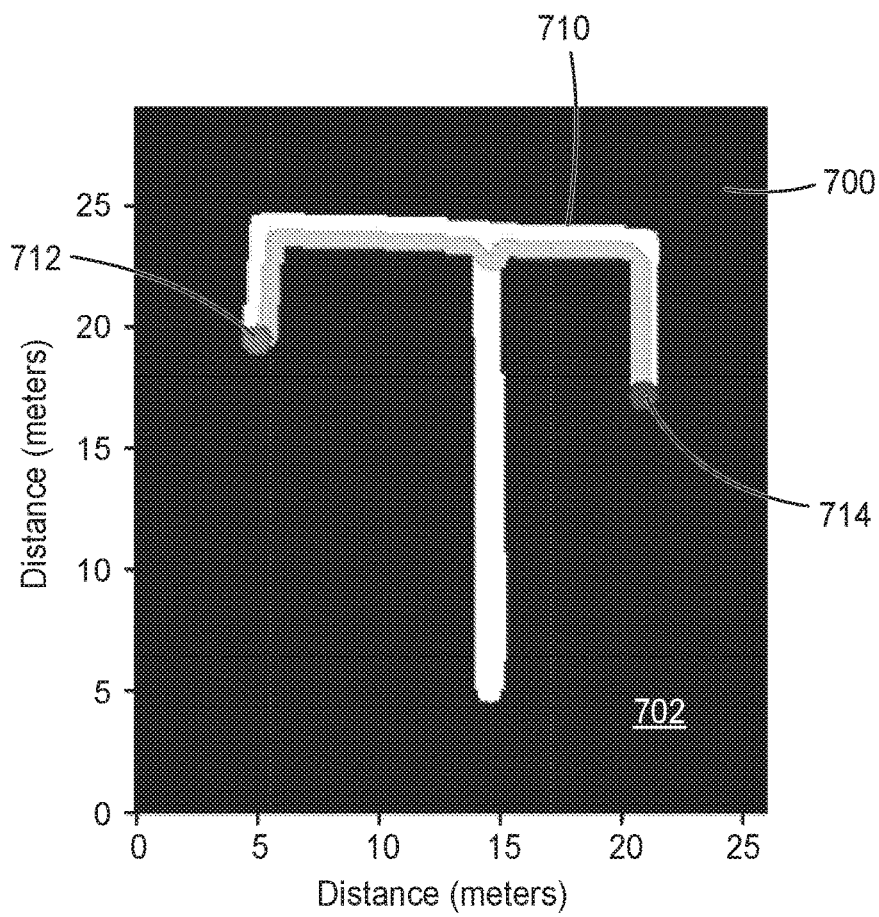
FIG. 7 is a 2D map generated from a path and a route determined thereon, according to one embodiment.

Various maps of the environment can be generated based on the path(s) from 450. In some embodiments, a map can be built based on the tracked paths from one or more mobile objects in the environment. In some embodiments, one or more paths can be projected onto a 2-dimensional (2D) plane associated with a plane of the surrounding environment to generate a 2D map thereof. In some embodiments, one or more paths can be associated with a 3-dimensional (3D) space of the surrounding environment to generate a 3D map thereof. Optimal routes between two locations in any one of the maps can determined. The mapping and routing information derived from the path(s) can be displayed to a user via a user interface. For example, FIG. 7 illustrates a route 716 between the current location 714 and the goal location 712. The route 716 is determined based on the 2D map 700 built on the path(s) 710 tracked from one or more mobile objects travelling in the environment.

Figure 5:
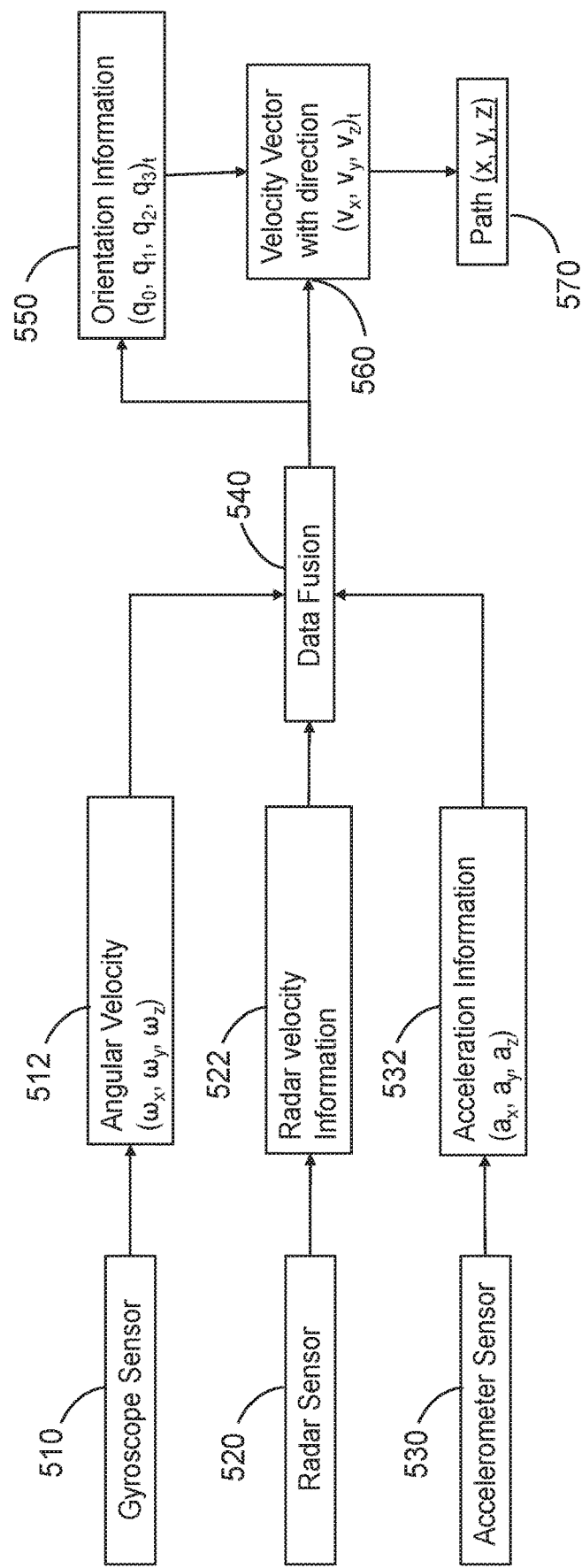
FIG. 5 is block diagram illustrating a method of mapping and routing, according to one embodiment.

The method of mapping and routing described herein may rely on a fusion of sensing data collected by a sensor assembly. FIG. 5 is block diagram illustrating a method of multi-sensor data fusion, according to one embodiment. A gyroscope sensor 510 provides angular velocities ($\omega_x$, $\omega_y$, $\omega_z$) of the mobile object at 512. A radar sensor 520 provides one or more radar velocities of the mobile object (e.g., a person) with respect to one or more surrounding objects (e.g., a floor). An accelerometer sensor 530 provides accelerations ($a_x$, $a_y$, $a_z$) of the mobile object. The sensing data 512, 522 and 532 from the sensors 510, 520 and 530 are provided to a fusion component 540 of a processor to determine real-time translation and absolute orientation information of the mobile object based on suitable data fusion algorithms.

Figure 6:
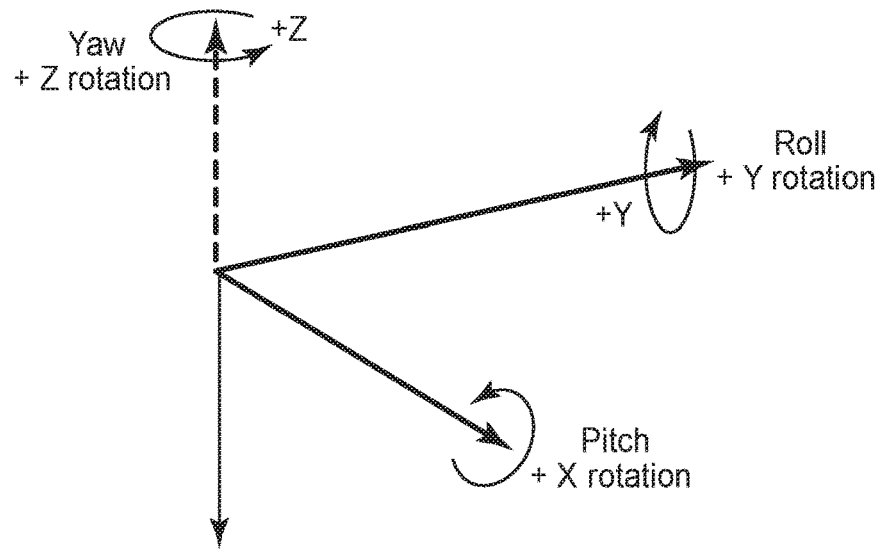
FIG. 6 is a schematic diagram of rotation and orientation by using an accelerometer with a gyroscope, according to one embodiment.

In some embodiments, the absolute orientation information of the mobile object, e.g., represented by a quaternion ($q_0$, $q_1$, $q_2$, $q_3$) at 550, can be determined by combining the angular velocities ($\omega_x$, $\omega_y$, $\omega_z$) at 512 from the gyroscope sensor 510 with the accelerations ($a_x$, $a_y$, $a_z$) at 532 of the mobile object from the accelerometer sensor 530. In the embodiment depicted in FIG. 6, the measured accelerations from the accelerometer sensor provides a gravity reference, where the angles between the 3 axes (x, y, z) of the gyroscope sensor and the gravity reference can be determined. Integration of the angular velocities ($\omega_x$, $\omega_y$, $\omega_z$) with respect to the gravity reference can provide an absolute orientation information ($q_0$, $q_1$, $q_2$, $q_3$) of the mobile object. Without the gravity reference, the gyroscope sensor may provide a relative orientation, e.g., a real-time change of the orientation of the mobile object can be detected. One disadvantage of this method is that the result may diverge with time due to integration errors and the limited precision of the gyroscope. The combination of a gyroscope and an accelerometer described herein can overcome such technical disadvantage by establishing a global coordinate system and determining the absolute or unambiguous orientation information.

The absolute orientation information ($q_0$, $q_1$, $q_2$, $q_3$) at 550 can be applied to the one or more radar velocities at 522 measured by the radar sensor 520 to determine a time series of pose information of the mobile object, i.e., to determine both the real-time position and absolute orientation of the mobile object. Each measured radar velocity of the mobile object can be decomposed to the x, y and z axes as $v_x$, $v_y$ and $v_z$ at 560 based on the corresponding absolute orientation information of the mobile object. Integration of the velocities $v_x$, $v_y$, and $v_z$ over time can obtain a path 570 of the mobile object in the environment, e.g., a time series of coordinates (x, y, z) of the mobile object in the global coordinate system.

For example, in one embodiment, the radar sensor can be mounted on a wearable pack worn by a mobile object, pointing to a floor with a pointing angle. The pointing angle (e.g., gamma) of the radar sensor with respect to the plane of the floor can be dynamically determined by an IMU based on the absolute orientation information ($q_0$, $q_1$, $q_2$, $q_3$). When the mobile object moves through the space, a forward speed (i.e., a translation speed parallel to the plane of the floor) of the mobile object along the path can be dynamically determined, for example, by using the cosine function (a cosine (gamma)) to calculate the forward speed of the mobile object parallel to the floor. Integration of the forward speed of the mobile object over time can obtain a path of the mobile object on the floor, e.g., a time series of coordinates (x, y) of the mobile object on the floor.

The obtained path(s) can be used to create one or more 2 dimensional (2D) or 3 dimensional (3D) maps. The maps can provide areas within an environment (e.g., a building) that mobile objects can navigate. FIG. 7 illustrates a 2D map 700 on a floor 702 based on the obtained path(s) when a mobile object moves on the floor 702. The 2D map 700 provides various paths on the floor 702 that a mobile object can navigate and can be used to create a route from one location to another location on the floor 702.

In some embodiments, suitable search algorithms can be employed to optimally determine a route from a map. In some embodiments, an A* algorithm can be used to automatically determine and present a route given a start location and a goal location. The A* algorithm is a known search algorithm which can formulate path planning by representing the environment as a graph of nodes in which edges between the nodes are paths which can be traversed. It is to be understood that any suitable search algorithms other than the A* algorithm can be used to determine route(s) from path(s)/map(s) from one or more mobile objects travelling in the environment.

In some embodiments, an automatically determined route may have the least cost possible in terms of distance travelled based on the map, or it may be based on a different combination of cost factors. One example of the generated "shortest egress route out" can be seen in FIG. 7 where the route 716 is determined between the current location 714 and the goal location 712 of the 2D map 700 which is built on the path(s) 710 tracked from one or more mobile objects travelling in the environment.

In some embodiments, the automatically determined path/route/map can be displayed, via a user interface, to a user. The user can amend the system-recommended path/route, based on some visualization of the mapping information collected by the system.

In some embodiments, 3D maps can be created to correctly represent a 3D environment where the mobile object is in, including one or more vertical elevations of the path, e.g., ascending/descending stairs between different floors of a multi-story building. Such track of vertical elevation can be achieved by the integration of the velocities $v_x$, $v_y$, and $v_z$ over time to obtain one or more 3D path(s) of the mobile object along the vertical elevation of the path (e.g., along the z axis).

The obtained path/route/map can be augmented by some structure-based mapping information derived from the features (e.g., a wall, a floor, a ceiling, etc., inside a building) observed in the environment surrounding the mobile object. In some embodiments, one or more imaging sensors such as, for example, a thermal imaging sensor, a visible light imaging sensor, etc., can be used to capture imaging data of the surrounding objects in the environment. The captured images/data can be used to build 3D point maps of environments. For example, in some embodiments, a 3D map can be built based on the thermal imaging data, the visible light imaging data, radar-detected object data, or any combination thereof that goes beyond where the mobile object traveled and may include a map of the surrounding environment such as, for example, rooms, hallways, etc.

In some embodiments, a structure-from-motion approach can utilize visual features from sensor images (e.g., thermal imaging data, visible light imaging data, etc.) to track the 2D positions of surrounding objects in the environment over image frames. When the imaging sensors move along with the mobile object to capture images, the structure-from-motion approach can track positions of targeted features from a time series of image frames. Using the tracked 2D positions from the frames, the system can triangulate the 3D relative position of the targeted features to build a point cloud of the environment (e.g., a wall, a floor, a ceiling, a room, a hallway, etc.).

In some embodiments, an intelligent environment monitor can be provided to monitor related aspects of the environment, e.g., to determine whether the environment has a low visibility or not. Suitable computer vision techniques can be applied to detect the related aspects of the environment such as, for example, thick smoke in the environment. Based on the monitor's perception of the environment, the system can determine the relative weighting of the sensing data from the various sensors of the sensor assembly. For example, the system can determine what imaging modality (e.g., thermal or visible light) to use as supplemental sensors along with an IMU and/or an RF radar unit.

In some embodiments, the intelligent environment monitor can be used to better target the correct type of features in the environment to be tracked. For example, when the intelligent environment monitor determines that the environment has a low visible contrast, e.g., in a hallway where the walls and ceiling are painted a uniform color and the floor has no texture on it, the intelligent environment monitor may evoke a thermal imaging sensor to capture thermal imaging data, instead of using a visible light imaging sensor. When the intelligent environment monitor determines that the thermal contrast for the targeted features in the environments is low, the intelligent environment monitor may evoke a visible light imaging sensor to capture visible light imaging data, instead of using a thermal imaging sensor. In this manner, the system can intelligently monitor the environment and choose suitable imaging sensors (e.g., thermal cameras, visible light cameras, or a combination thereof) to better track the correct type of features in the environment.

In some embodiments, the imaging data (e.g., thermal or visible light imaging data) of the surrounding objects in the environment can be combined with the sensing data from an IMU and a RF radar to provide additional information to a user when the imaging data are available. In some embodiments, the imaging data can be utilized to remove signal noise from the IMU and radar sensing data.

Figure 8:
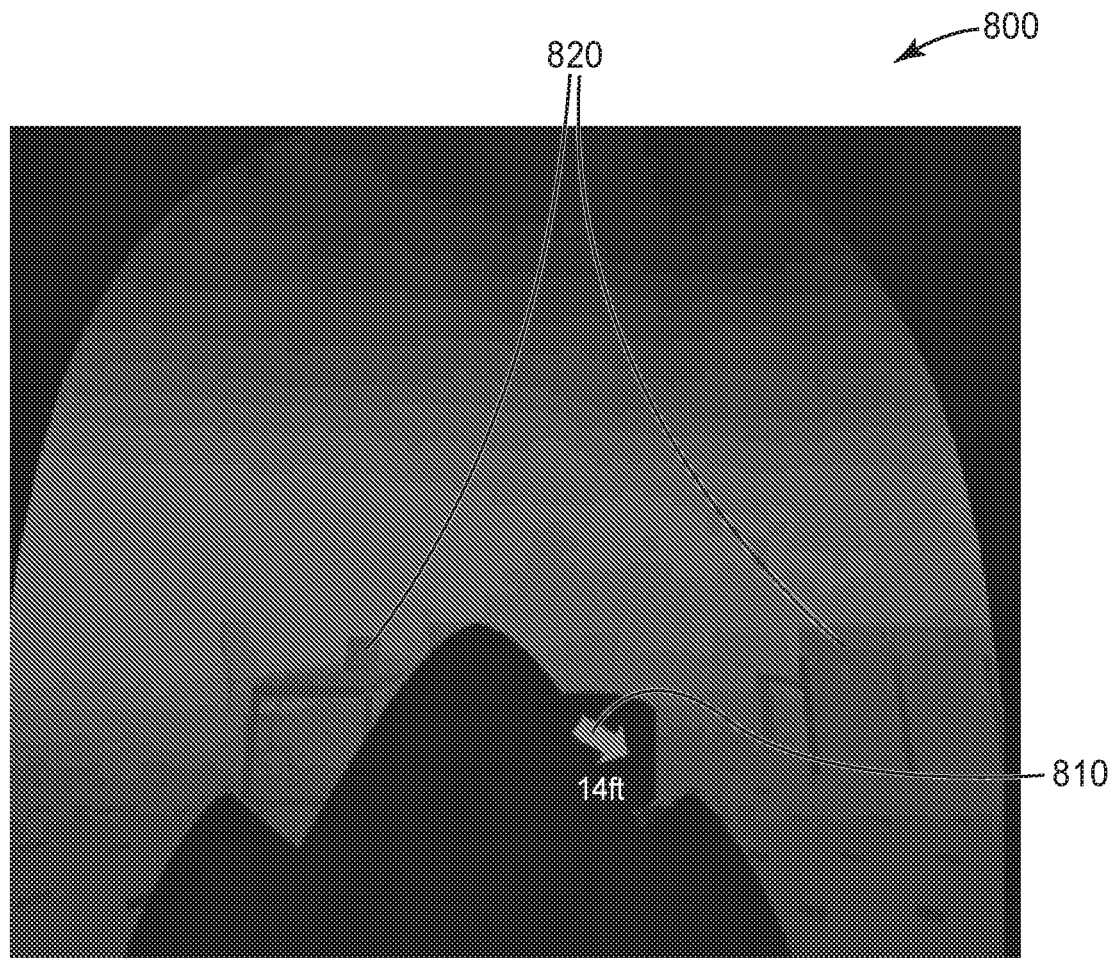
FIG. 8 is a screenshot of a user interface of a mapping and routing system, according to one embodiment.

A user interface can be provided to convey mapping and routing information derived from a path/map to a user. In some embodiments, the user interface may be provided as a wearable heads-up style user interface. The user interface can provide continuously-updated navigation information for a mobile object, for example, a dynamic arrow pointing out the path at a destination, or a waypoint on the way to a destination. FIG. 8 is a screenshot of a user interface 800 of a mapping and routing system, according to one embodiment. The exemplary user interface 800 provides mapping and routing information to a mobile object (e.g., a firefighter) in the environment. The user interface 800 can be displayed to the user (e.g., a firefighter) via a wearable device (e.g., an in-mask display) functionally connected to the processor 20 of FIG. 1. In the depicted embodiment of FIG. 8, the user interface 800 includes a dynamic arrow 810 pointing out which way to go in the environment. The mapping and routing information presented, via the user interface 800, to the user can be superimposed with the actual, visible-to-the-user scene of the surrounding environmental features 820. In some embodiments, the surrounding environmental features 820 can be captured and displayed by suitable augmented reality techniques.

Figure 9:
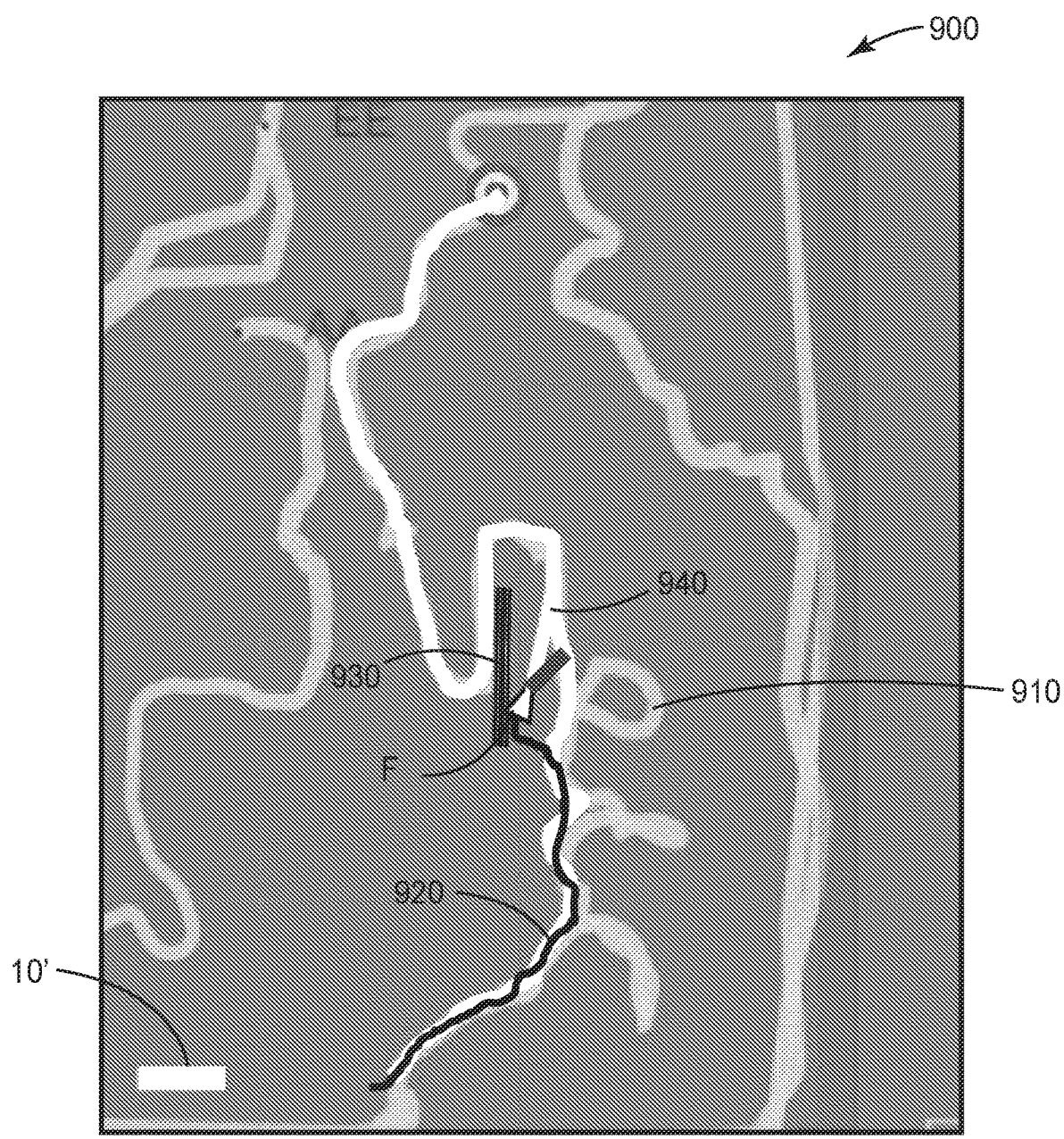
FIG. 9 is a screenshot of a user interface of a mapping and routing system, according to another embodiment.

In some embodiments, the user interface can provide frequently-updated smart guidance derived from suitable search algorithms to optimally determine a route from a map. For example, an A* algorithm can be used to automatically determine and present a route given a start location and a goal location in a map, such as the exemplary route 716 determined from the map 700 as shown in FIG. 7. FIG. 9 is a screenshot of a user interface 900 of a mapping and routing system, according to one embodiment. The exemplary user interface 900 displays a 'birds-eye' view of the paths generated by one or more mobile objects or users including a user "F". The actual turn-by-turn route guidance for one user can be communicated via a user interface such as, for example, the user interface 800 depicted in FIG. 8. Alternatively, the route guidance can be communicated verbally by another, non-mobile, user through verbal (e.g. radio) communication with the aid of the 'birds-eye' view of the dynamic paths such as the exemplary user interface 900 of FIG. 9. For example, in the embodiment illustrated in FIG. 9, the user "F" traversed a path 920 in response to the smart guidance which is based on the A* algorithm to provide a new path 940 that leads the user "F" back to the known path 910. Such smart guidance can be dynamically communicated to the user "F" by any suitable means (e.g., visually or verbally).

Figure 10:
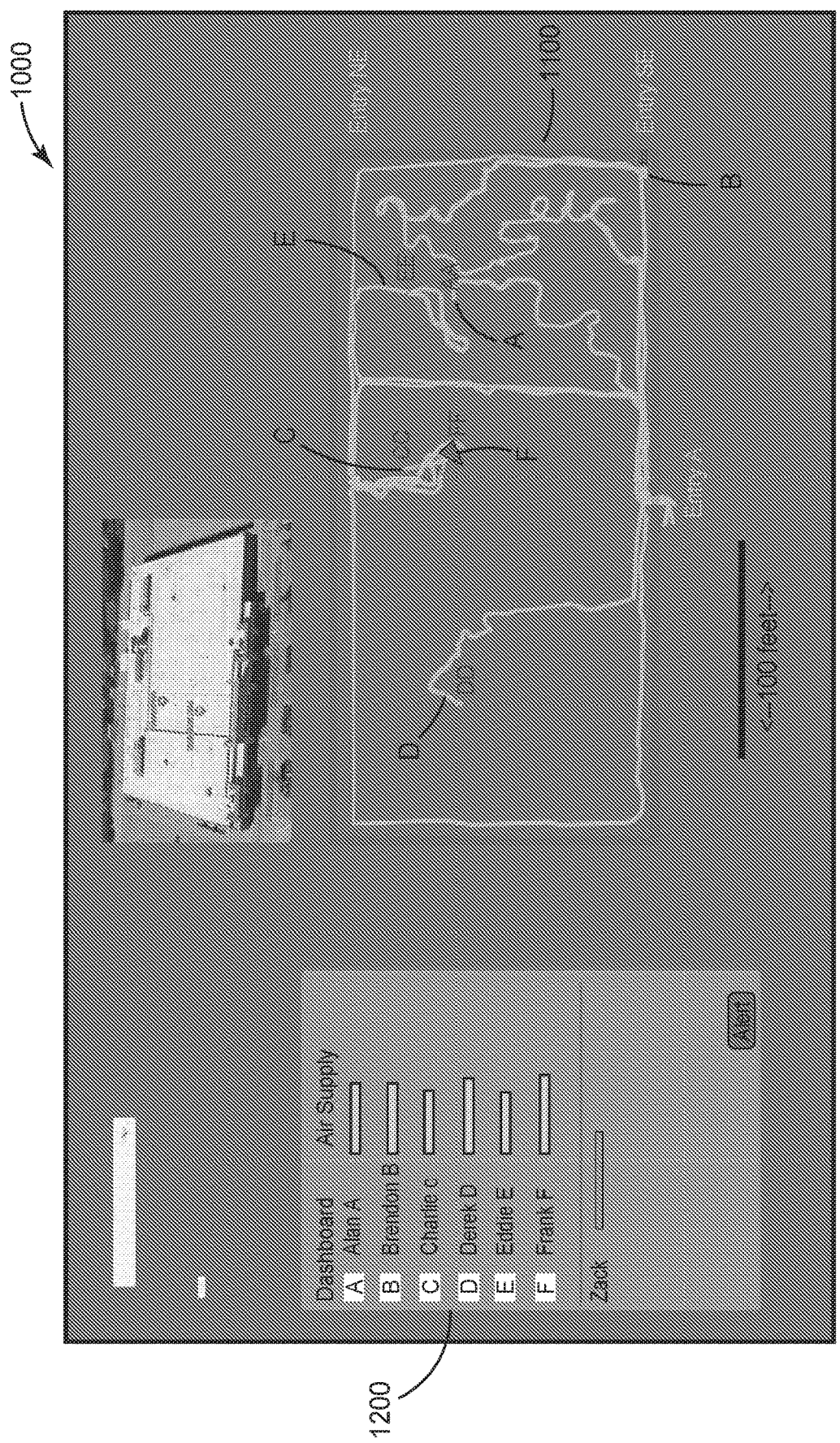
FIG. 10 is a screenshot of a user interface of a mapping and routing system, according to another embodiment.

In some embodiments, the user interface may be provided as a dashboard-style user interface. The user interface can provide continuously or frequently updated dynamic tracks paths of multiple mobile objects in the environment (e.g., within a building). In some embodiments, the user interface can provide a smart guidance for a user (e.g., a non-mobile incident commander) by combining path segments captured from the motions of multiple mobile objects inside the environment. FIG. 10 is a screenshot of a user interface 1000 of a mapping and routing system, according to one embodiment. The user interface 1000 includes a window 1100 to display a dynamic map having tracks of multiple mobile objects (e.g., firefighters A, B, C, D, E, and F) within the environment (e.g., inside a building). The user interface 1000 further includes a dashboard 1200 to display the status data of the multiple mobile objects.

Unless otherwise indicated, all numbers expressing quantities or ingredients, measurement of properties and so forth used in the specification and embodiments are to be understood as being modified in all instances by the term "about." Accordingly, unless indicated to the contrary, the numerical parameters set forth in the foregoing specification and attached listing of embodiments can vary depending upon the desired properties sought to be obtained by those skilled in the art utilizing the teachings of the present disclosure. At the very least, and not as an attempt to limit the application of the doctrine of equivalents to the scope of the claimed embodiments, each numerical parameter should at least be construed in light of the number of reported significant digits and by applying ordinary rounding techniques.

Exemplary embodiments of the present disclosure may take on various modifications and alterations without departing from the spirit and scope of the present disclosure. Accordingly, it is to be understood that the embodiments of the present disclosure are not to be limited to the following described exemplary embodiments, but is to be controlled by the limitations set forth in the claims and any equivalents thereof.

Listing of Exemplary Embodiments

Exemplary embodiments are listed below. It is to be understood that any one of embodiments 1-17 and 18-21 can be combined.

Embodiment 1 is a method of mapping and routing comprising:
providing a sensor assembly mounted on the wearable pack to be worn by a mobile object, the sensor assembly comprising an inertial measurement unit (IMU) and one or more radio-frequency (RF) radar units;
collecting, via the sensor assembly, sensing data comprising (i) one or more radar velocities from the one or more RF radar units, (ii) one or more angular velocities of the mobile object from the IMU, and (iii) one or more linear accelerations from the IMU;
determining, via a processor, translation information and absolute orientation information of the mobile object based on the sensing data;
determining, via the processor, a time series of poses of the mobile object based on a combination of the determined translation information and the determined absolute orientation information; and
combining, via the processor, the time series of poses into a path of the mobile object.

Embodiment 2 is the method of embodiment 1, wherein the absolute orientation information of the mobile object is determined based on the sensing data from the IMU comprising a gyroscope and an accelerometer.

Embodiment 3 is the method of embodiment 2, wherein the one or more angular velocities from the gyroscope are combined with a gravity reference from the accelerometer to provide the absolute orientation information.

Embodiment 4 is the method of any one of embodiments 1-3, wherein collecting the sensing data further comprises scanning, via the one or more RF radar units, one or more surrounding objects to obtain a time series of radar images.

Embodiment 5 is the method of embodiment 4, further comprising tracking, via the processor, positions of the one or more identified objects in the time series of radar images.

Embodiment 6 is the method of embodiment 5, further comprising generating, via the processor, additional translation information based on the tracked positions in the time series of radar images.

Embodiment 7 is the method of embodiment 5, further comprising generating, via the processor, additional orientation information of the mobile object based on the tracked positions in the time series of radar images.

Embodiment 8 is the method of any one of embodiments 1-7, further comprising projecting, via the processor, the path onto a 2-dimensional (2D) plane associated with a plane of the surrounding environment to generate a 2D map thereof.

Embodiment 9 is the method of embodiment 8, further comprising associating, via the processor, the map with one of multiple stories or floors in a building.

Embodiment 10 is the method of any one of embodiments 1-9, further comprising associating, via the processor, the path with a 3-dimensional (3D) space of a surrounding environment to generate a 3D map thereof.

Embodiment 11 is the method of embodiment 8 or 10, further comprising determining, via the processor, an optimal or near-optimal route between two locations based on the 2D or 3D map.

Embodiment 12 is the method of any one of embodiments 1-11, further comprising displaying to a user, via a user interface, mapping and routing information derived from the path.

Embodiment 13 is the method of embodiment 12, wherein the user interface displays a "birds-eye" view of mapping and routing information from one or more mobile objects.

Embodiment 14 is the method of any one of embodiments 1-13, further comprising providing one or more thermal imaging sensors to sense one or more thermal images.

Embodiment 15 is the method of any one of embodiments 1-14, further comprising providing one or more cameras to capture one or more visible images of one or more surrounding objects.

Embodiment 16 is the method of embodiment 14 or 15, further comprising building a point cloud of a surrounding environment based on the thermal images or the visible images.

Embodiment 17 is the method of any one of embodiments 1-16, further comprising providing an intelligent environment monitor configured to monitor a surrounding environment and adaptively determine the relative weighting of the sensing data from the sensor assembly.

Embodiment 18 is a mapping and routing system comprising:
a wearable pack;
a sensor assembly mounted on the wearable pack to be worn by a mobile object, the sensor assembly comprising an inertial measurement unit (IMU) and one or more radio-frequency (RF) radar units, the sensor assembly configured to sense data comprising (i) one or more radar velocities from the one or more RF radar units, (ii) one or more angular velocities of the mobile object from the IMU, and (iii) one or more linear accelerations from the IMU; and a processor configured to:
determine translation information and absolute orientation information of the mobile object based on the sensing data from the sensor assembly;
determine a time series of poses of the mobile object based on a combination of the determined translation information and orientation information; and
combine the time series of poses into a path of the mobile object.

Embodiment 19 is the system of embodiment 18, wherein the IMU comprises a gyroscope and an accelerometer, and the absolute orientation information of the mobile object is determined based on the sensing data from the gyroscope and the accelerometer.

Embodiment 20 is the system of embodiment 19, wherein the gyroscope is configured to sense the one or more angular velocities, and the accelerometer is configured to provide a gravity reference.

Embodiment 21 is the system of any one of embodiments 18-20, wherein the IMU and the one or more RF radar units are mechanically coupled with a known spatial relationship.

Reference throughout this specification to "one embodiment," "certain embodiments," "one or more embodiments," or "an embodiment," whether or not including the term "exemplary" preceding the term "embodiment," means that a particular feature, structure, material, or characteristic described in connection with the embodiment is included in at least one embodiment of the certain exemplary embodiments of the present disclosure. Thus, the appearances of the phrases such as "in one or more embodiments," "in certain embodiments," "in one embodiment," or "in an embodiment" in various places throughout this specification are not necessarily referring to the same embodiment of the certain exemplary embodiments of the present disclosure. While the specification has described in detail certain exemplary embodiments, it will be appreciated that those skilled in the art, upon attaining an understanding of the foregoing, may readily conceive of alterations to, variations of, and equivalents to these embodiments.

What is claimed is:

1. A method of mapping and routing, comprising:
mounting a sensor assembly on a wearable pack to be worn by a mobile object, the sensor assembly comprising an inertial measurement unit (IMU) and one or more radio-frequency (RF) radar units;
collecting, via the sensor assembly, sensing data comprising (i) one or more radar velocities from the one or more RF radar units, (ii) one or more angular velocities of the mobile object from the IMU, and (iii) one or more linear accelerations from the IMU;
determining, via a processor, translation information and absolute orientation information of the mobile object based on the sensing data;
determining, via the processor, a time series of poses of the mobile object based on a combination of the determined translation information and the determined absolute orientation information; and
combining, via the processor, the time series of poses into a path of the mobile object.

2. The method of claim 1, wherein the absolute orientation information of the mobile object is determined based on the sensing data from the IMU comprising a gyroscope and an accelerometer.

3. The method of claim 2, wherein the one or more angular velocities from the gyroscope are combined with a gravity reference from the accelerometer to provide the absolute orientation information.

4. The method of claim 1, wherein collecting the sensing data further comprises scanning, via the one or more RF radar units, one or more surrounding objects to obtain a time series of radar images.

5. The method of claim 4, further comprising tracking, via the processor, positions of the one or more identified objects in the time series of radar images.

6. The method of claim 5, further comprising generating, via the processor, additional translation information based on the tracked positions in the time series of radar images.

7. The method of claim 5, further comprising generating, via the processor, additional orientation information of the mobile object based on the tracked positions in the time series of radar images.

8. The method of claim 1, further comprising projecting, via the processor, the path onto a 2-dimensional (2D) plane associated with a plane of a surrounding environment to generate a 2D map thereof.

9. The method of claim 8, further comprising associating, via the processor, the map with one of multiple stories or floors in a building.

10. The method of claim 1, further comprising associating, via the processor, the path with a 3-dimensional (3D) space of a surrounding environment to generate a 3D map thereof.

11. The method of claim 8 or 10, further comprising determining, via the processor, an optimal or near-optimal route between two locations based on the 2D or 3D map.

12. The method of claim 1, further comprising displaying to a user, via a user interface, mapping and routing information derived from the path.

13. The method of claim 12 wherein the user interface displays a "birds-eye" view of mapping and routing information from one or more mobile objects.

14. The method of claim 1, further comprising providing one or more thermal imaging sensors to capture one or more thermal images.

15. The method of claim 1, further comprising providing one or more cameras to capture one or more visible images of one or more surrounding objects.

16. The method of claim 1, further comprising providing an intelligent environment monitor configured to monitor a surrounding environment and adaptively determine the relative weighting of the sensing data from the sensor assembly.

17. A mapping and routing system comprising:
a wearable pack;
a sensor assembly mounted on the wearable pack to be worn by a mobile object, the sensor assembly comprising an inertial measurement unit (IMU) and one or more radio-frequency (RF) radar units, the sensor assembly configured to sense data comprising (i) one or more radar velocities from the one or more RF radar units, (ii) one or more angular velocities of the mobile object from the IMU, and (iii) one or more linear accelerations from the IMU; and
a processor configured to:
determine translation information and absolute orientation information of the mobile object based on the sensing data from the sensor assembly;

determine a time series of poses of the mobile object based on a combination of the determined translation information and orientation information; and combine the time series of poses into a path of the mobile object.

18. The system of claim 17, wherein the IMU comprises a gyroscope and an accelerometer, and the absolute orientation information of the mobile object is determined based on the sensing data from the gyroscope and the accelerometer.

19. The system of claim 18, wherein the gyroscope is configured to sense the one or more angular velocities, and the accelerometer is configured to provide a gravity reference.

20. The system of claim 17, wherein the IMU and the one or more RF radar units are mechanically coupled with a known spatial relationship.

* * * * *